J. S. ALCORN.
DIFFERENTIAL GEARING.
APPLICATION FILED AUG. 24, 1917.

1,354,937.

Patented Oct. 5, 1920.

Inventor:
John S. Alcorn,
by Roberts Roberts Cushman
Attorneys.

J. S. ALCORN.
DIFFERENTIAL GEARING.
APPLICATION FILED AUG. 24, 1917.

1,354,937.

Patented Oct. 5, 1920.
2 SHEETS—SHEET 2.

Inventor:
John S. Alcorn,
by Rohrt Rohrts Kuchman
His Attorneys.

UNITED STATES PATENT OFFICE.

JOHN S. ALCORN, OF NEW HAVEN, CONNECTICUT, ASSIGNOR OF ONE-THIRD TO CHARLES S. FARQUHAR, OF BOSTON, MASSACHUSETTS, AND ONE-THIRD TO ROBERT J. LYND, OF SOMERVILLE, MASSACHUSETTS.

DIFFERENTIAL GEARING.

1,354,937.	Specification of Letters Patent.	Patented Oct. 5, 1920.

Application filed August 24, 1917. Serial No. 187,946.

*To all whom it may concern:*

Be it known that I, JOHN S. ALCORN, a citizen of the United States, and resident of New Haven, in the county of New Haven and State of Connecticut, have invented new and useful Improvements in Differential Gearing, of which the following is a specification.

As is well known the primary function of differential gearing is to drive two traction wheels or the like in such manner that one wheel may rotate more rapidly than the other at times, as when driving a vehicle along a curved path. The bevel gear type and other types of differential gearing now in common use perform this function in a very satisfactory manner but they have certain inherent disadvantages which render them exceedingly unsatisfactory. For example, their mode of operation is such that when the resistance to the two wheels becomes unbalanced to a substantial degree, the wheel having the greater load stops and all of the power is transmitted to the wheel having the lower resistance, instances of this action, such as when one of the driving wheels of an automobile strikes an oily, icy or sandy spot, being notorious.

The principal object of the present invention is to provide differential gearing which, while it will perform the primary function of differential gearing, is free from the objectionable features of former types of differential gearing, and which will not permit one wheel to spin when the resistance to the driving wheels becomes unbalanced. To this end I provide differential gearing which is highly efficient in driving the traction wheels together in normal operation but which is highly inefficient as power transmitting means in driving either traction wheel faster than the other so that the two traction wheels are virtually locked together, inasmuch as power from the prime mover cannot be shunted to one wheel even though the resistance applied to the wheel is practically *nil*, although one wheel is permitted freely to rotate faster than the other in driving along a curved path.

A feature of the invention consists in that the differential gears are disposed transversely of the traction gears, that is, the axes of the differential gears are not parallel with the axes of the traction gears. Another feature consists in that the differential gears are connected together by gearing which is independent thereof, that is, which do not mesh with the differential gears.

In the accompanying drawings,—

Figure 1:
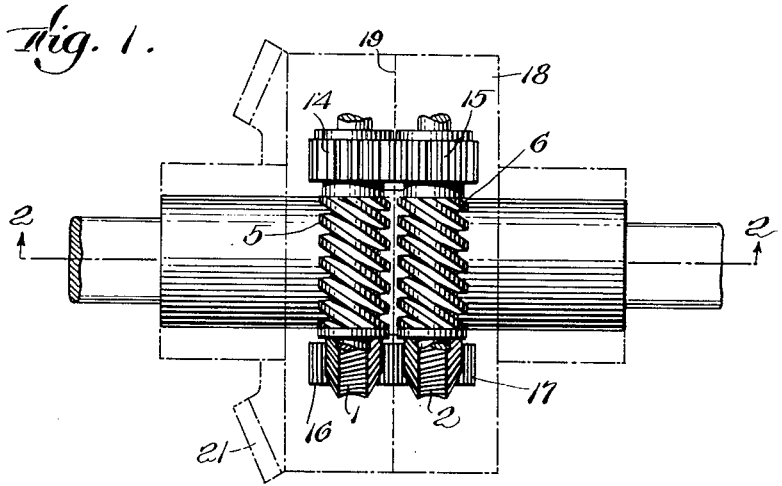
Figure 1 is a plan view of one embodiment of the invention.

The embodiment shown on sheet 1 of the drawings comprises traction gears 1 and 2 for driving traction wheels or the like connected to shafts 3 and 4 and two sets of differential gears 5—6 and 7—8 meshing with the traction gears 1 and 2. The traction gears 1 and 2 are provided with sleeves or hubs 9 and 10 extending outwardly therefrom, these sleeves having a circular cross-sectional contour on the outside and a square cross-sectional contour on the inside, the inside being adapted to receive the square shafts 3 and 4 so that the shafts may slide longitudinally of the sleeves and yet be constrained to rotate with the sleeves. Between the traction gears 1 and 2 is provided a spacer 11 having circular extensions 12 and 13 which extend into the holes in the respective traction gears. The respective sets of differential gears 5—6 and 7—8 are connected together by spur gears 14—15 and 16—17. Each differential gear with its corresponding spur gear is journaled in a casing 18, this casing being shown in dot and dash lines in Fig. 1 and in full lines in Figs. 2 and 3. The casing 18 is preferably formed in two parts which meet along the line 19 in Fig. 1 and the two parts are secured together by means of bolts 20. Secured to one side of the casing 18 collinearly with the traction gears is a beveled spur gear 21 to which the prime motor is connected for the purpose of supplying power to the mechanism.

In operation the casing 18 is rotated about the axis of the traction gears through the medium of gear wheel 21, the sets of differential gears 5—6 and 7—8 revolving around the axis of the traction gears with the casing 18 inasmuch as they are mounted in the casing. The revolution of the differential gears produces rotation of the shafts 3 and 4 through the medium of traction gears 1 and 2. Thus, when the vehicle is traveling in a straight line the entire mechanism shown in Figs. 1 and 2 rotates bodily together without any rotative motion between the respective parts thereof. The traction gears 1 and 2 are not rotated relatively to each other but are rotated together as a unit by virtue of the unique characteristics of the present invention which will now be described.

Figure 2:
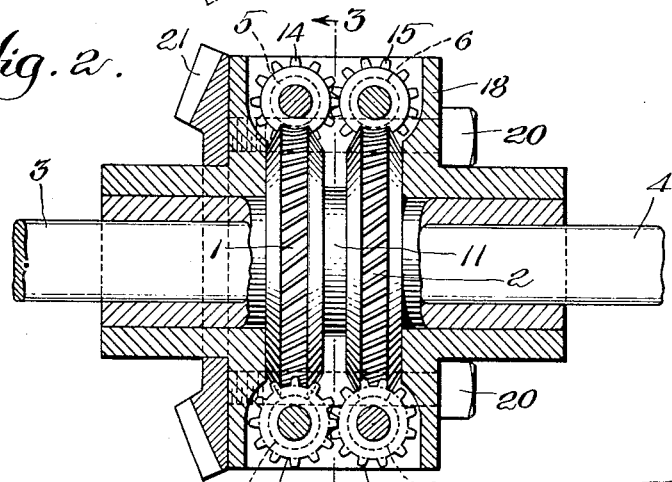
Fig. 2 is a central longitudinal section taken on line 2—2 of Fig. 1.

The traction gears 1 and 2 are helical in character, the pitch of each gear being in the same direction, as shown in Fig. 2, and the differential gears 5—6 and 7—8 are also helical in character, the traction gears being of the type commonly called worm gears and the differential gears being of the type commonly called worms. Inasmuch as the pitch of each of the traction gears is in the same direction, and inasmuch as the differential gears are directly connected together through the medium of spur gears 14—15 and 16—17, the bodily revolution of the differential gears about the axis of the traction gears tends to rotate the differential gears 5 and 6 and the differential gears 7 and 8 in the same direction about their respective axes. This tendency is obviously counteracted by virtue of the fact that the differential gears are directly connected together. For example, if the casing 18 be rotated in a clockwise direction (Fig. 3), the differential gear 5 would tend to rotate in a counter clockwise direction (Fig. 2) by virtue of its engagement with the traction gear 1 and the differential gear 6 would likewise tend to rotate in a counter clockwise direction (Fig. 2) by virtue of its engagement with traction gear 2, the differential gears 7 and 8 likewise tending to rotate in the same direction; but as already stated, this tendency is counteracted by the spur gears 14—15 and 16—17. When driving along a curved path so that one of the traction gears tends to rotate faster than the other, the differential gears of each set 5—6 and 7—8 rotate in opposite directions, and permit the relative movement between the traction gears 1 and 2. For example, if the shaft 4 is rotated faster than the shaft 3 in turning to the left, the traction gear 2 will be rotated faster than the traction gear 1, thus rotating the differential gears 6 and 8, the rotation of these differential gears is transmitted to the differential gears 5 and 7 through the medium of the spur gears, and the differential gears 5 and 7 are caused to travel at a compensating rate of speed on traction gear 1. Thus my improved differential gearing functions to permit one of the traction wheels to rotate faster than the other as does the ordinary differential gearing.

The principal advantage of my improved apparatus is that when one traction wheel meets with a much lower resistance than the other traction wheel, it will not spin and therefore will not prevent power being transmitted to the other wheel which has good traction. This is due to the fact that the pitch-angle of the traction gears is given a unique value such that no substantial amount of power can be transmitted to the wheel tending to slip in a condition such as described, without a relatively large amount of power being transmitted to the wheel having good traction. In the preferred embodiment of my invention this unique pitch-angle comprises an angle slightly greater than the minimum pitch-angle with which power can be transmitted from the traction to the differential gears, respectively, which angle may be termed the critical angle. I believe the preferred angle to be of the order of about 30° to 40°. With such an angle the traction wheels will just drive the differential gears. For example, if the wheel connected to shaft 4 be lifted off the ground while the wheel connected to shaft 3 rests on the ground and if the wheel connected to shaft 4 be rotated, the traction gear 2 will drive differential gears 6 and 8, differential gears 6 and 8 will drive spur gears 15 and 17, the spur gears 15 and 17 will drive the spur gears 14 and 16, the spur gears 14 and 16 will drive differential gears 6 and 7, and the differential gears 5 and 7 will travel around the stationary traction gear 1.

However, no appreciable amount of power can be transmitted through the differential gearing, the differential gearing being highly inefficient as a power transmitting means by virtue of the low pitch-angle. Therefore, when power is being transmitted to the traction wheels through the differential gearing the power cannot be shunted to one of the traction wheels when it meets with a low resistance, as when in coming in contact with a smooth spot on the roadway, since the power would have to be transmitted to this wheel through the differential gearing, that is, by rotating the parts of the differential gearing relatively to each other. Owing to the inefficient character of the differential gearing, due to the low pitch-angle, the load applied to each of the differential gears will be balanced when one wheel tends to slip by virtue of the inefficient connection between the differential and traction gears associated with the wheel tending to slip. Power will therefore be transmitted to the wheel having good traction.

Figure 5:
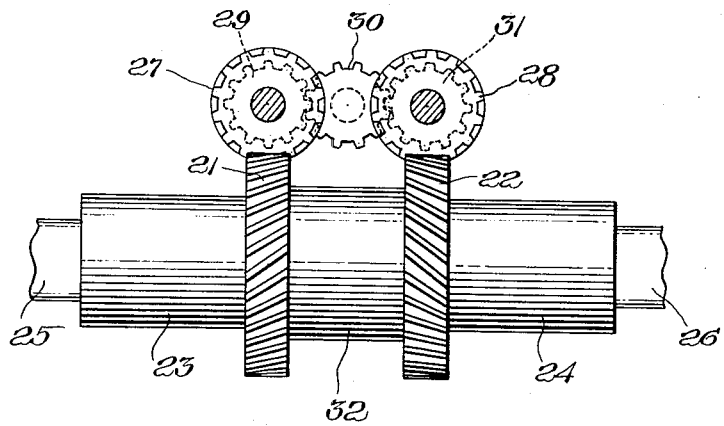
Fig. 5 is an elevation of a modified embodiment of the invention.
Figure 6:
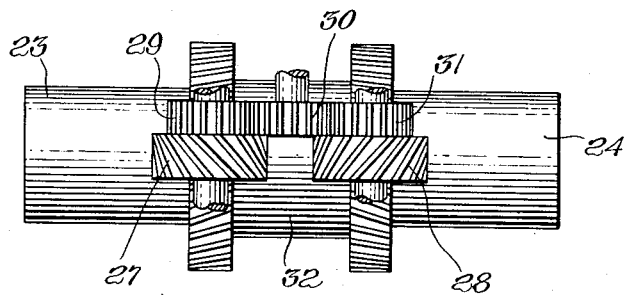
Fig. 6 is a plan view of the embodiment shown in Fig. 5.

In Figs. 5 and 6 I have illustrated a modification of my invention which comprises traction gears 21 and 22 separated by a spacer 32 and having sleeves 23 and 24 receiving the square shafts 25 and 26, differential gears 27 and 28 meshing with the traction gears 21—22 respectively, and spur gears 29, 30 and 31 connecting the differential gears 27 and 28 together. It will be noted that this modification differs from that shown on sheet 1 in two respects, namely, in that so-called spiral gears are employed instead of worms for the differentials, and in that the differential gears are not connected directly together but through the medium of the intermediate gear 30. Both the so-called spiral gears and the so-called worms are helical in character and I illustrate both types in order clearly to show that I contemplate using either type of helical gear.

When using an intermediate gear the pitch of the traction gears is in opposite directions instead of in the same direction but the mode of operation is substantially the same. The rotation of the differential gears about the axis of the traction gears tends to rotate the differential gears in opposite directions instead of in the same direction, but this tendency is counteracted by the intermediate gear. When using an intermediate gear, with the pitch of the respective traction gears in opposite directions, the end thrust produced on the traction gears is in opposite directions and may be counter-balanced by sloping the teeth in such directions that the end thrust on each traction gear is directed inwardly so that the only effect of the end thrust is to force the traction gears tightly against the spacer 32. Moreover, this still further tends to prevent one wheel from spinning inasmuch as it tends to lock the traction gears together, through the medium of spacer 32, while permitting them to turn relatively to each other in traveling along a curved path.

Figure 3:
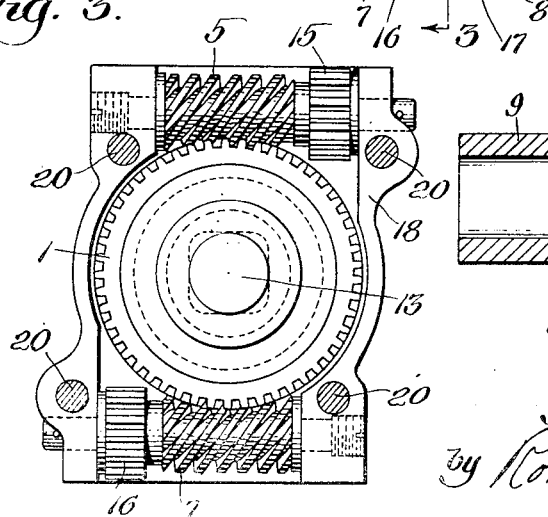
Fig. 3 is a transverse central section taken on line 3—3 of Fig. 2.
Figure 4:
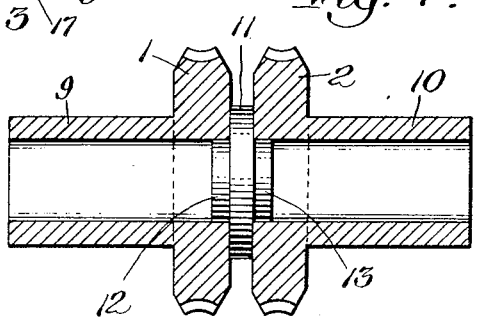
Fig. 4 is a longitudinal central section of the traction gear wheels shown in Figs. 1, 2 and 3.
Figure 7:
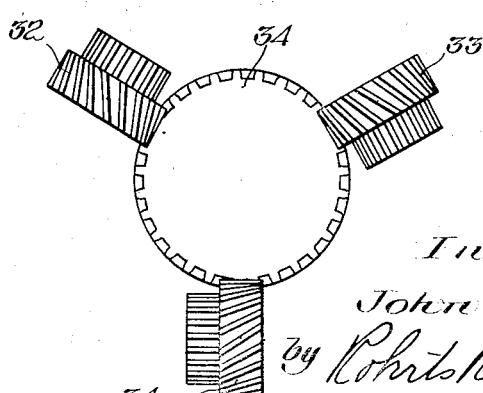
Fig. 7 is an end view of an embodiment of the invention similar to that shown in Figs. 5 and 6 but showing three sets of differential gears associated with the traction gears.

The modification shown in Fig. 7 is essentially the same as that shown in Figs. 5 and 6, Fig. 7 merely illustrating the fact that three sets of differential gears 32, 33 and 34 may be equally spaced about the periphery of the traction gears 34. Obviously, any desired number of sets of differential gears may be employed, Figs. 1 and 3 illustrating two sets, Figs. 5 and 6 one set, and Fig. 7 three sets.

I claim:

1. Power transmission mechanism including two shaft sections; relatively rotatable worm gears whose teeth slope in diverging directions, one in driving connection with each shaft section; a worm in mesh with each worm gear; a pinion turning with each worm; means for causing the aforesaid pinions and worms to turn in similar directions; a carrier rotatable with respect to said worm gears and upon which said worms, pinions and means are mounted; and means for turning said carrier.

2. Power transmission mechanism including two shaft sections; relatively rotatable worm gears whose teeth slope in diverging directions, one in driving connection with each shaft section; a worm in mesh with each worm gear; means for turning said worms in similar directions; a carrier rotatable with respect to said worm gears and upon which said worms are mounted; and means for turning said carrier.

3. Differential transmission mechanism comprising two spiral gears collinearly related, two gear elements arranged to rotate about parallel axes, said gear elements comprising two gears geared together and spiral gears meshing with said first spiral gears respectively, and a housing rotatable about the axis of said first spiral gears, said gear elements being rotatably mounted in said housing.

Signed by me at Boston, Massachusetts, this 21st day of August, 1917.

JOHN S. ALCORN.